United States Patent
Jeyapaul et al.

(10) Patent No.: US 11,682,282 B2
(45) Date of Patent: Jun. 20, 2023

(54) FIBER BRAGG GRATING-BASED ADVANCE PNEUMATIC FIRE/OVERHEAT DETECTOR

(71) Applicant: Kidde Technologies, Inc., Wilson, NC (US)

(72) Inventors: Elbert Jeyapaul, Bangalore (IN); Thambiraj Avudaiappan, Bangalore (IN); Scott Kenneth Newlin, Willow Spring, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 218 days.

(21) Appl. No.: 17/088,323

(22) Filed: Nov. 3, 2020

(65) Prior Publication Data

US 2021/0280033 A1  Sep. 9, 2021

(51) Int. Cl.
*G08B 17/103* (2006.01)
*G01K 11/3206* (2021.01)
*G02B 6/02* (2006.01)
*G08B 17/06* (2006.01)

(52) U.S. Cl.
CPC ........ *G08B 17/103* (2013.01); *G01K 11/3206* (2013.01); *G02B 6/0208* (2013.01); *G08B 17/06* (2013.01)

(58) Field of Classification Search
CPC ...... G08B 17/103; G08B 17/06; G08B 17/04; G01K 11/3206; G01K 3/005; G02B 6/0208
See application file for complete search history.

(56) References Cited

U.S. PATENT DOCUMENTS

| | | | |
|---|---|---|---|
| 7,196,318 B2 * | 3/2007 | Shin | G01D 5/35303 73/705 |
| 8,641,274 B2 * | 2/2014 | Omichi | G01L 1/246 374/161 |
| 8,764,678 B2 * | 7/2014 | Bremer | G01L 11/02 600/561 |
| 9,443,408 B2 | 9/2016 | Rennie et al. | |
| 10,436,652 B2 | 10/2019 | Wilson et al. | |
| 11,162,852 B1 * | 11/2021 | Jeyapaul | G01L 9/0077 |
| 2016/0216166 A1 | 7/2016 | Kwon et al. | |
| 2019/0277708 A1 | 9/2019 | Miller | |
| 2019/0277709 A1 | 9/2019 | Miller et al. | |

FOREIGN PATENT DOCUMENTS

EP     3096117 A1    11/2016

OTHER PUBLICATIONS

Extended European Search Report dated Jul. 2, 2021, received for corresponding European Application No. 21152788.2, 6 pages.

* cited by examiner

*Primary Examiner* — John A Tweel, Jr.
(74) *Attorney, Agent, or Firm* — Kinney & Lange, P.A.

(57) ABSTRACT

A system for detecting a fire or overheating event includes a heat detector, an optical fiber, a photodetector, and a processing unit. The pneumatic heat detector includes a sealed chamber sealed with a diaphragm having an initial position, and the optical fiber is in operable communication with the diaphragm. The optical fiber includes a Fiber Bragg Grating (FBG). The optical signal generator is configured to emit an optical signal with into the optical fiber. The photodetector is configured to receive a reflected optical signal from the FBG. The processing unit is configured to correlate the reflection wavelength of the reflected optical signal with a temperature of the heat detector.

17 Claims, 3 Drawing Sheets

FIBER BRAGG GRATING-BASED ADVANCE PNEUMATIC FIRE/OVERHEAT DETECTOR

BACKGROUND

This disclosure relates generally to aircraft fire and overheat detection systems. More particularly, this disclosure relates to optical signals used in aircraft system overheat and fire detection systems.

During operation of an aircraft, numerous on-board components and sub-systems are continuously or periodically monitored. Various methods for monitoring these components and sub-systems of the aircraft have been used. For example, sensors and/or transducers can be affixed to an aircraft at specific locations so as to produce signals indicative of various physical phenomena experienced at those specific locations. These signals can then be transmitted to an analyzer that interprets the signals received by the analyzer. These signals can be processed to generate parametric data that can be correlated to measurements of physical phenomena. Some of the specific locations where it would be desirable to affix a sensor and/or transducer might be locations that have harsh environments. For example, some such locations might expose any affixed sensor to high temperatures, high pressures, high levels of exposure to electromagnetic interference, etc.

In particular, advance pneumatic detectors are used to detect fire/overheat events. An advance pneumatic detector (APD) is a tube sealed at one end with a movable diaphragm. The diaphragm forms one electrical contact side of an electrical alarm switch. When the gas inside the tube is heated it expands, pressing out the diaphragm, which in turn closes the alarm circuit, signaling a fire/overheat event to the crew. When the tube leaks gas, a second, similar switch opens, signaling a failure to the crew. Current mechanical systems with APDs can be complicated to manufacture and/or assemble, and the switch components can be contaminating during assembly, leading to potential latent failures in the field.

Optical transducers have found use in many of harsh environment locations. Optical sensors and/or transducers can produce optical signals indicative of various physical phenomena. For example, optical transducers can produce optical signals indicative of stress, strain, temperature, tilt, rotation, vibration, pressure, etc. Various sensors and/or transducers employ various types of technologies. For example, some sensors use Fabry-Perot Interferometry (FPI), while others use fiber Bragg grating (FBG) technologies. Some of these technologies and techniques produce optical signals having a spectrum that is indicative of the measured parameter. Spectrum analysis and/or spectral measurement of such signals is performed to determine a measure of the physical phenomena causing the specific spectrum of the optical signal.

SUMMARY

A system for detecting a fire or overheating event the system includes a heat detector, an optical fiber, a photodetector, and a processing unit. The pneumatic heat detector includes a sealed chamber sealed with a diaphragm having an initial position, and the optical fiber is in operable communication with the diaphragm. The optical fiber includes an FBG. The optical signal generator is configured to emit an optical signal into the optical fiber. The photodetector is configured to receive a reflected optical signal from the FBG. The processing unit is configured to correlate the reflection wavelength of the reflected optical signal with a temperature of the heat detector.

A method for detecting an overheat condition includes transmitting an optical single into an optical fiber having a fiber Bragg grating coupled to a diaphragm of a heat detector, and detecting a reflection wavelength of a reflected optical signal reflected by the fiber Bragg grating using a photodetector. The reflected optical signal is then correlated to a temperature of the heat detector.

DETAILED DESCRIPTION

Engine fire/overheat events are critical failures in an aircraft and therefore are carefully monitored. Current systems employed include APDs connected to electrical alarm circuits. This physical connection makes the system expensive to manufacture, complicated to assemble, and susceptible to latent failures. A single FBG can be used to replace the electrical alarm switch and fault switch, making it more reliable, and less complicated to manufacture and assemble.

As described herein, an FBG is coupled to the metal diaphragm of a pneumatic tube that is filled with a pressurized gas. Light is transmitted through the FBG and a wavelength of light is reflected back to a light sensor. When a fire/overheat event occurs the gas expands, pressing out the diaphragm, which compresses the FBG, resulting in a wavelength shift. Conversely, if a failure in the pneumatic tube occurs the pressure reduces, collapsing the diaphragm, which in turn stretches the FBG or releases compression, resulting in a different wavelength shift. Fire/overheat events and faults in the detector can be detected by determining the direction and magnitude of the shift in the wavelength of reflected light. The resulting sensor is more accurate, lighter, smaller, and less prone to latent failures.

Figure 1:
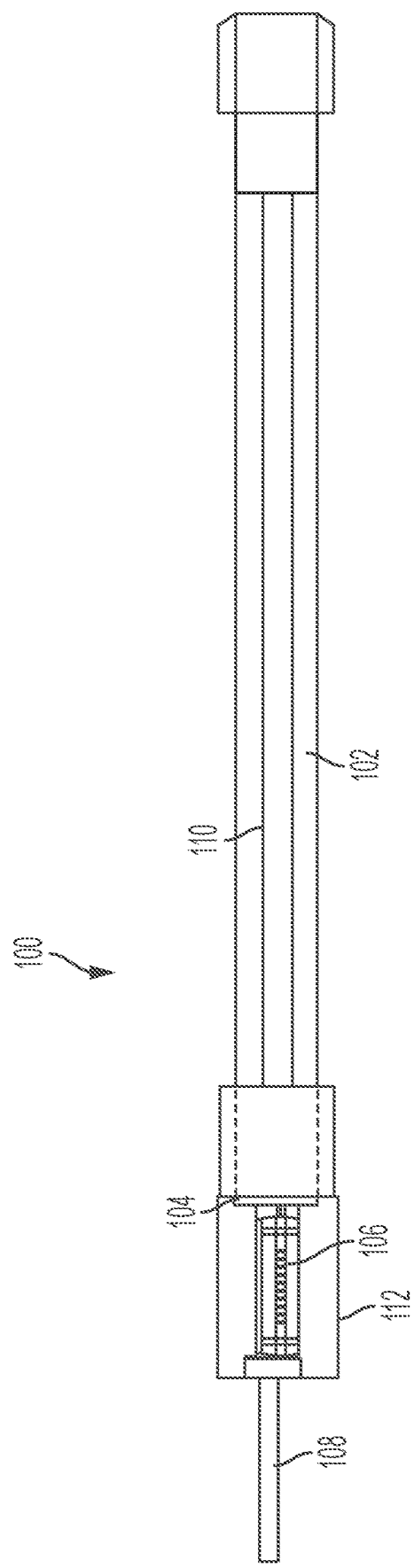
FIG. 1 is a perspective view of a representative fire/overheat detection system with a fiber Bragg grating (FBG) coupled to an advance pneumatic detector.

FIG. 1 is a perspective view of a representative fire/overheat detection system 100 with a fiber Bragg grating (FBG) coupled to an APD. FIG. 1 shows fire/overheat detection system 100 having pneumatic tube 102, diaphragm 104, FBG 106, light source/detector 108, inert gas 110, and enclosure 112. Pneumatic tube 102 is filled with inert gas 110 under pressure. Pneumatic tube 102 is sealed at one end with diaphragm 104. FBG 106 is surrounded by enclosure 112 and attached to diaphragm 104 at one end and secured at the opposite end. Light source/detector 108 is configured to transmit light through FBG 106 and receive the reflected light.

Pneumatic tube 102 is a thin elongated tube which is hermetically sealed. The tube can be, for example, between 1 foot and 80 feet, between 3 feet and 60 feet, or between 5 feet and 40 feet. The circumference of the tube can be, for example, between 0.040 inches to 0.1 inches, between 0.05 inches and 0.08 inches, or between 0.06 and 0.07 inches. The tube can be made from, for example, stainless steel, nickel alloys, other metal alloys, fiberglass, ceramic, polymer, or a combination thereof. The pneumatic tube is filled with inert gas 110. The gas in the pneumatic tube is under pressure. The pressure can be, for example, between 15 PSI and 450 PSI, between 20 PSI and 425 PSI, or between 30 PSI and 400 PSI. The pneumatic tube in placed in an area where a fire/overheat event could occur, for example an engine.

Pneumatic tube 102 is sealed at one end with diaphragm 104. Diaphragm 104 is a thin membrane of a flexible material. The membrane can have, for example, a thickness of between 0.25 mm and 1.5 mm, between 0.30 mm and 1.25 mm, or between 0.5 mm and 1 mm. The flexible material is a material which can suitably move under the change in inert gas pressure enough to induce measurable stress on the FBG. When the temperature rises, for example in a fire/overheat event, gas 110 expands and the pressure increases. In these cases, diaphragm 104 can deform outward to create a measurable pressure on the FBG. When pneumatic tube 102 is damaged, the pressure of inert gas 110 will decrease due to leakage of the gas out of pneumatic tube 102, and as a result, diaphragm 104 can collapse, resulting in a detectable change of pressure on the FBG.

Figure 2:
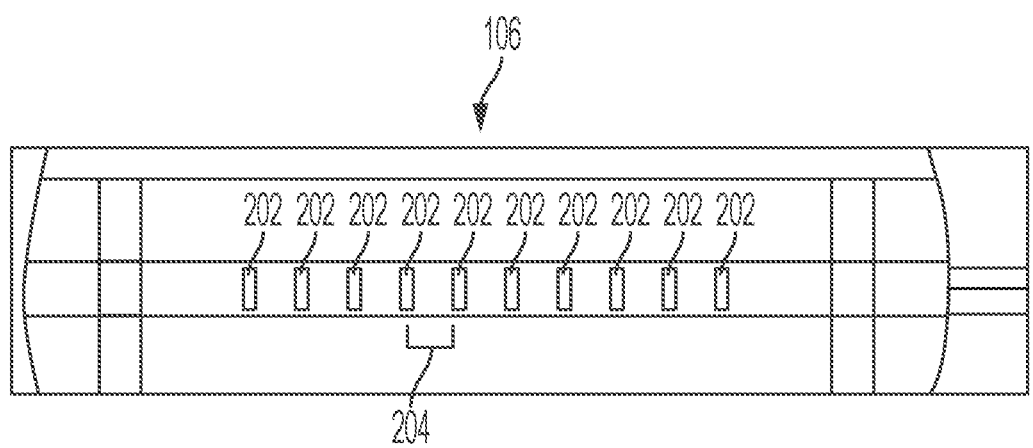
FIG. 2 is a perspective view of an FBG.

Diaphragm 104 is connected to FBG 106. FBG 106 is connected to diaphragm 104 and light source/detector 108 in such a way that a deformation of diaphragm 104 will change the amount of strain on FBG 106. FBG 106 can be fixedly connected to diaphragm 104 and/or light source/detector 108. FBG 106 can be held in place at diaphragm 104 and/or detector 108 by a pressure or friction fit, such that collapse of diaphragm decreases strain. As shown in FIG. 2, FBG 106 is a short segment of optical fiber that reflects particular wavelengths of light and transmits others. The optical fiber can be made of, for example, glass, polymer, or a combination thereof. Grating inclusions 202 in the refractive index of the fiber core of FBG 106 generates a wavelength-specific dielectric mirror. Variation in the refractive index can be accomplished through grating inclusions. Distance 204 between grating inclusions 202 when FBG 106 is uninstalled and at standard temperature can be, for example, between 3 nm and 8 nm, between 4 nm and 7 nm, or between 5 nm and 6 nm. When FBG 106 is installed in the APD and the system is at standard temperature and pressure it has an initial strain. When the strain on FBG 106 increases or decreases relative to the initial strain due to deformation of diaphragm 104 the distance between variations 202 changes, correspondingly changing the wavelength reflected by variations 202. The total length of FBG 106 can be between 1 mm and 7 mm, between 1.5 mm and 6 mm, or between 2 mm and 5 mm. FBG 106 is contained in enclosure 112. Enclosure 112 can be thermally and/or hermetically sealed.

Light is transmitted through FBG 106 by light source/detector 108. Light source/detector 108 can be one component designed to both transmit and detect wavelengths of light, or it can be multiple components which collectively transmit and detect wavelengths of light. The light source can be a continuous or intermittent light source. In some embodiments light source 108 is, for example, an optical pulse generator or broad spectrum laser. In some embodiments, light source 108 can transmit a continuous or pulsed electromagnetic spectrum in the UV range of, for example, between 5 nm and 400 nm, between 7.5 nm and 350 nm, or between 10 nm and 300 nm. In other embodiments, light source 108 can transmit discrete wavelengths of light. In some embodiments, light detector 108 is, for example, a photodetector. Incident light from light source 108 is transmitted through FBG 106. Light is reflected back to light detector 108. The wavelengths of light reflected are received and the information is transmitted to a processor for analysis and possible alarm.

Figure 3:
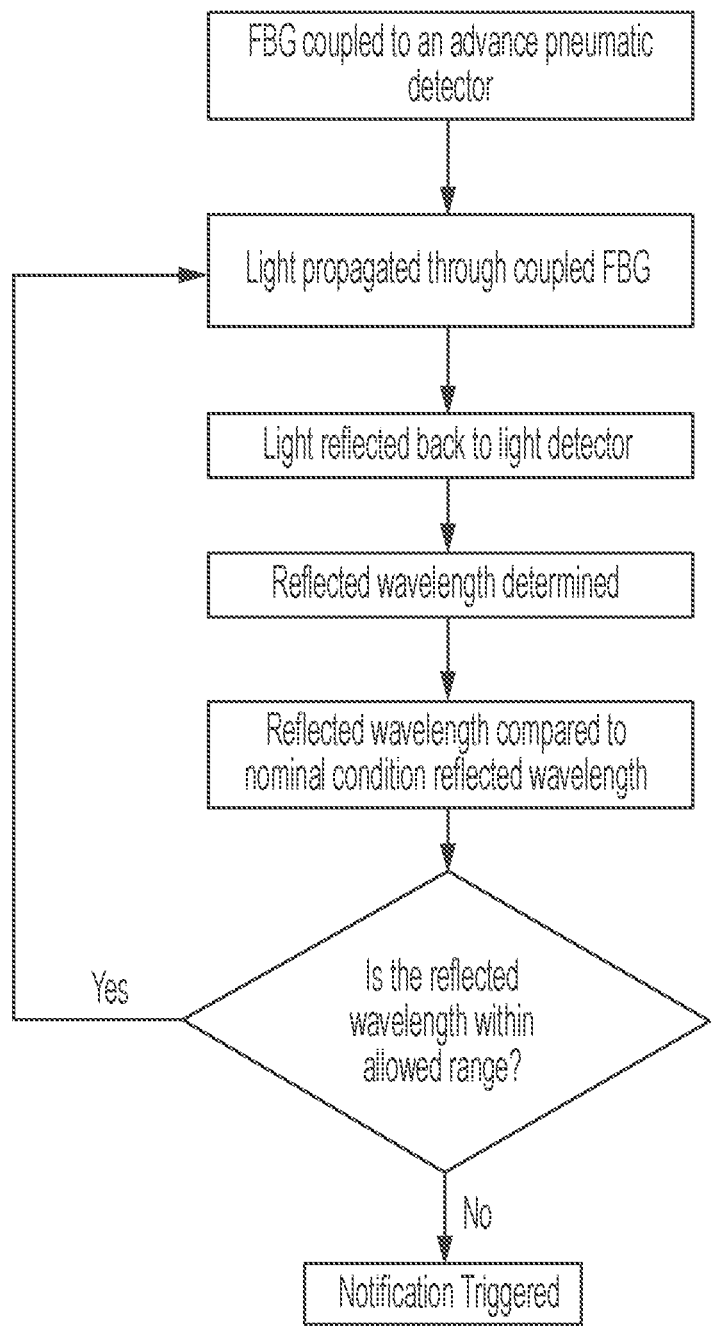
FIG. 3 is flow chart of a representative method for using a system described herein to detect a fire/overheat event.

FIG. 3 is flow chart of a representative method for using a system described herein to detect a fire/overheat event. FIG. 3 shows that a FBG is coupled to an advance pneumatic detector, as discussed above. Light is propagated through the coupled FBG. As the light travels through the FBG, it is selectively reflected back to the detector as discussed above. The light detector receives the reflected light. The light detector or an associated processor determines the wavelengths of light received. Wavelengths of reflected light corresponding to fire/overheat events, detector failure events, and standard operating conditions are predetermined. Predetermination can include experimental references and/or individual detector calibration (nominal condition). The reflected wavelength is compared to the predetermined wavelengths. If the reflect wavelength is within the allowed range corresponding to standard operating conditions then monitoring continues. If the reflected wavelength corresponds to a fire/overheat event or a detector failure event a notification is triggered. The notification can include the magnitude of the shift, the direction of the shift, which event the wavelength corresponds to, or a combination thereof.

DISCUSSION OF POSSIBLE EMBODIMENTS

The following are non-exclusive descriptions of possible embodiments of the present invention.

A system for detecting a fire or overheating event, the system comprising: a heat detector comprising a sealed chamber with a diaphragm; an optical fiber in operable communication with the diaphragm, the optical fiber comprising a fiber Bragg grating; an optical signal generator configured to emit an optical signal into the optical fiber; a photodetector configured to receive a reflected optical signal reflected from the fiber Bragg grating; and a processing unit configured to correlate a reflection wavelength of the reflected optical signal with a temperature of the heat detector.

The system of the preceding paragraph can optionally include, additionally and/or alternatively, any one or more of the following features, configurations and/or additional components:

A further embodiment of the foregoing system, wherein the diaphragm has an initial position and the initial position corresponds to a known safe operating temperature.

A further embodiment of any of the foregoing systems, wherein the heat detector further comprises a gas inside the sealed chamber having a pressure.

A further embodiment of any of the foregoing systems, wherein, at the known safe operating temperature, the pressure of the gas inside the sealed chamber is greater than a pressure outside of the sealed chamber.

A further embodiment of any of the foregoing systems, wherein the gas expands when heat is applied to the sealed chamber.

A further embodiment of any of the foregoing systems, further comprising an enclosure which is hermetically-sealed and thermally insulated, wherein the fiber Bragg grating is encapsulated within the enclosure.

A further embodiment of any of the foregoing systems, wherein the fiber Bragg grating has a length between 1 mm and 7 mm.

A further embodiment of any of the foregoing systems, wherein the fiber Bragg grating has a plurality of grating inclusions with a distance between each of the grating inclusions.

A further embodiment of any of the foregoing systems, wherein the distance between each of the grating inclusions is between 3 nm and 8 nm.

A further embodiment of any of the foregoing systems, wherein the optical signal generator is a laser.

A further embodiment of any of the foregoing systems, wherein the optical signal generator emits an initial spectrum and the initial spectrum is a continuous electromagnetic spectrum between 5 nm and 400 nm.

A further embodiment of any of the foregoing systems, wherein the diaphragm is configured to shift to a displaced position when the pressure in the sealed chamber changes, and the change from the initial position to the displaced position results in a shift in the reflected wavelength.

A further embodiment of any of the foregoing systems, wherein the processing unit is further configured to determine an extent of an overheat condition based upon wavelength shift information compared to the reflected wavelength at the initial position.

A further embodiment of any of the foregoing systems, wherein the triggering threshold is selected for a specific system and is a function of the reflected wavelength at the initial position.

A method of detecting an overheat condition, the method comprising: transmitting an optical signal into an optical fiber having a fiber Bragg grating, the optical fiber being coupled to a diaphragm of a heat detector; detecting a reflection wavelength of a reflected optical signal reflected by the fiber Bragg grating using a photodetector; and The method of the preceding paragraph can optionally include, additionally and/or alternatively, any one or more of the following features, configurations and/or additional components: correlating the reflection wavelength to a temperature of the heat detector.

A further embodiment of any of the foregoing methods, further comprising comparing the temperature to a triggering threshold temperature wherein the triggering threshold temperature corresponds to an overheat condition.

A further embodiment of the foregoing method, further comparing the reflection wavelength to a triggering threshold reflection wavelength, wherein the triggering threshold reflection wavelength corresponds to a loss of pressure in the pneumatic heat detector.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for detecting a fire or overheating event, the system comprising:
   a heat detector comprising a sealed chamber with a diaphragm;
   an optical fiber fixedly connected to the diaphragm, the optical fiber comprising a fiber Bragg grating;
   an optical signal generator configured to emit an optical signal into the optical fiber;
   a photodetector configured to receive a reflected optical signal reflected from the fiber Bragg grating; and
   a processing unit configured to correlate a reflection wavelength of the reflected optical signal with a temperature of the heat detector, wherein the processing unit is further configured to correlate the reflection wavelength of the reflected optical signal with a damage condition to the sealed chamber.

2. The system of claim 1, wherein the diaphragm has an initial position and the initial position corresponds to a known safe operating temperature.

3. The system of claim 2, wherein the heat detector further comprises a gas inside the sealed chamber having a pressure.

4. The system of claim 3, wherein, at the known safe operating temperature, the pressure of the gas inside the sealed chamber is greater than a pressure outside of the sealed chamber.

5. The system of claim 2, wherein the gas expands when heat is applied to the sealed chamber.

6. The system of claim 1, further comprising an enclosure which is hermetically-sealed and thermally insulated, wherein the fiber Bragg grating is encapsulated within the enclosure.

7. The system of claim 1, wherein the fiber Bragg grating has a length between 1 mm and 7 mm.

8. The system of claim 1, wherein the fiber Bragg grating has a plurality of grating inclusions with a distance between each of the grating inclusions.

9. The system of claim 8, wherein the distance between each of the grating inclusions is between 3 nm and 8 nm.

10. The system of claim 1, wherein the optical signal generator is a laser.

11. The system of claim 1, wherein the optical signal generator emits an initial spectrum and the initial spectrum is a continuous electromagnetic spectrum between 5 nm and 400 nm.

12. The system of claim 2, wherein the diaphragm is configured to shift to a displaced position when the pressure in the sealed chamber changes, and the change from the initial position to the displaced position results in a shift in the reflected wavelength.

13. The system of claim 12, wherein the processing unit is further configured to determine an extent of an overheat condition based upon wavelength shift information compared to the reflected wavelength at the initial position.

14. The system of claim 2, wherein a triggering threshold is selected for a specific system and is a function of the reflected wavelength at the initial position.

15. A method of detecting an overheat condition, the method comprising:
   transmitting an optical signal into an optical fiber having a fiber Bragg grating, the optical fiber being fixedly connected to a diaphragm of a heat detector;
   detecting a reflection wavelength of a reflected optical signal reflected by the fiber Bragg grating using a photodetector;
   correlating the reflection wavelength to a temperature of the heat detector; and
   correlating the reflection wavelength of the reflected optical signal with a damage condition to a sealed chamber, wherein the sealed chamber is coupled to the diaphragm.

16. The method of claim 15, further comprising comparing the temperature to a triggering threshold temperature, wherein the triggering threshold temperature corresponds to an overheat condition.

17. The method of claim 15, further comprising comparing the reflection wavelength to a triggering threshold reflection wavelength, wherein the triggering threshold reflection wavelength corresponds to a loss of pressure in the pneumatic heat detector.

* * * * *